Sept. 15, 1970          G. D. BROWN          3,529,231

DIRECT CURRENT TRANSFORMER

Filed Dec. 26, 1968          2 Sheets-Sheet 1

(a)

(b)

George D. Brown,
INVENTOR

United States Patent Office 3,529,231
Patented Sept. 15, 1970

3,529,231
DIRECT CURRENT TRANSFORMER
George D. Brown, Huntsville, Ala., assignor to the United States of America as represented by the Secretary of the Army
Filed Dec. 26, 1968, Ser. No. 787,080
Int. Cl. H02m 3/18, 3/22
U.S. Cl. 321—2                3 Claims

ABSTRACT OF THE DISCLOSURE

A push-pull type direct current transformer circuit having a direct current voltage connected at an input terminal for being transformed up or down at an output terminal. Four integrated chopper type transistors and a storage capacitor are used in each side of the push-pull circuit. An alternating current source has a primary coil and eight secondary coils with the secondary coils connected across the base-collector electrodes of the eight integrated chopper type transistors. The alternating current source switches the direct current flow through the transistors in such a manner that each side of the push-pull circuit alternately charges and discharges their respective capacitors in opposite phase. The capacitors alternately dump their charges to the output terminal through mechanically closed switches.

BACKGROUND OF THE INVENTION

This invention is in the field of direct current transformers. Direct current transformers are a new area in which very little development has been done at this time for lack of new technology to thoroughly exploit the transformers. Electrostatic energy can be stored in capacitors and recovered whenever desired within a reasonable period of time. This is, of course, not new technology but the control and use of this energy creates new technology. There has always been a need for a device to raise or lower signal levels, and especially a device that would raise or lower signal levels independent of environment conditions. There is a definite need for a device that will pass current in either direction, stepping up the signal levels in one direction and stepping down the signal levels in the other direction.

SUMMARY OF THE INVENTION

The direct current (D.C.) transformer of this invention works by the technology of storage and release of energy on the plates of capacitors. A transistor switching arrangement is used to switch a storage capacitor in parallel with the D.C. source and then switch the capacitor in series with the D.C. source for permitting a step up of the D.C. voltage at an output terminal. A number of storage capacitors can be connected in push-pull in this manner for transforming the voltage upward, or the direct current voltage source can be connected at the previous output terminal and transform the voltage downward in the other direction.

The transistor switches used in this invention, for switching the capacitors in and out of the circuit with the D.C. voltage source, are controlled by the secondaries of an alternating current (A.C.) transformer. The transistors are integrated chopper type, having a double emitter bidirectional current path and a base-collector switching circuit. A signal applied to the primary of the A.C. transformer induces a like signal across the base-collector electrodes of the transistors. The polarities of the secondary windings of the A.C. transformer are connected for proper push-pull action in charging and releasing energy from the capacitors.

An object of this invention is to provide a novel direct current transformer for stepping up the signal in one direction and stepping the signal down in the other direction by using a plurality of integrated chopper transistors for switching voltages across storage capacitors that are connected in push-pull.

Another object of this invention is to provide a novel direct current transformer in which at least one storage capacitor is discharging into the output at all times, keeping the output voltage constant.

DESCRIPTION OF THE PREFERRED EMBODIMENT

Figure 1:
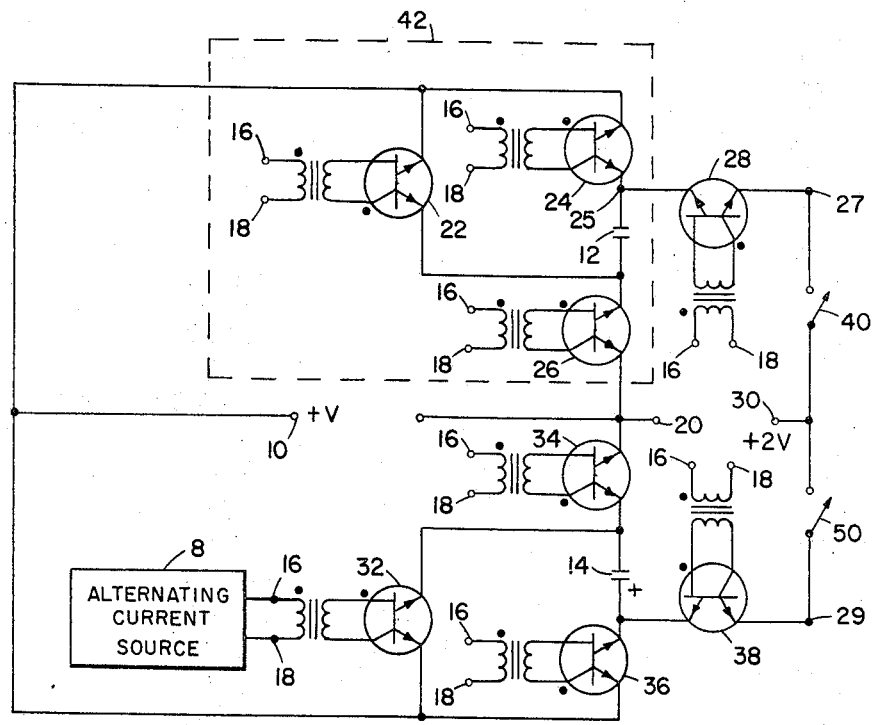
FIG. 1 is a schematic diagram of the direct current transformer of this invention.

Refer now to FIG. 1 for a description of the D.C. transformer of this invention. A unique feature of the D.C. transformer is that it can pass current in either direction. That is, if a D.C. voltage of say 1 volt, is applied to terminal 10, 2 volts will be present at terminal 30, and if 1 volt is applied at terminal 30, ½ volt will be present at terminal 10.

Eight transistor switching devices are utilized in the direct current transformer and are electrically isolated from each other. An alternating current (A.C.) transformer has a primary connected to alternating current source 8 across output terminals 16 and 18 with polarities as shown by dot notation. Eight secondary coils are connected across the base-collector electrodes of transistors 22, 24, 26, 28, 32, 34, 36, and 38 with their polarities as shown by dot notation. The straight line into the bar material is the base electrode and the offset line is the collection electrodes as characteristic of integrated chopper transistors. The transistors are integrated chopper type transistors with each transistor having two emitters as current paths and a base-collector switching circuit. One example of an integrated chopper type transistor is number 3N24 manufactured by Fairchild Semiconductor.

Figure 2:
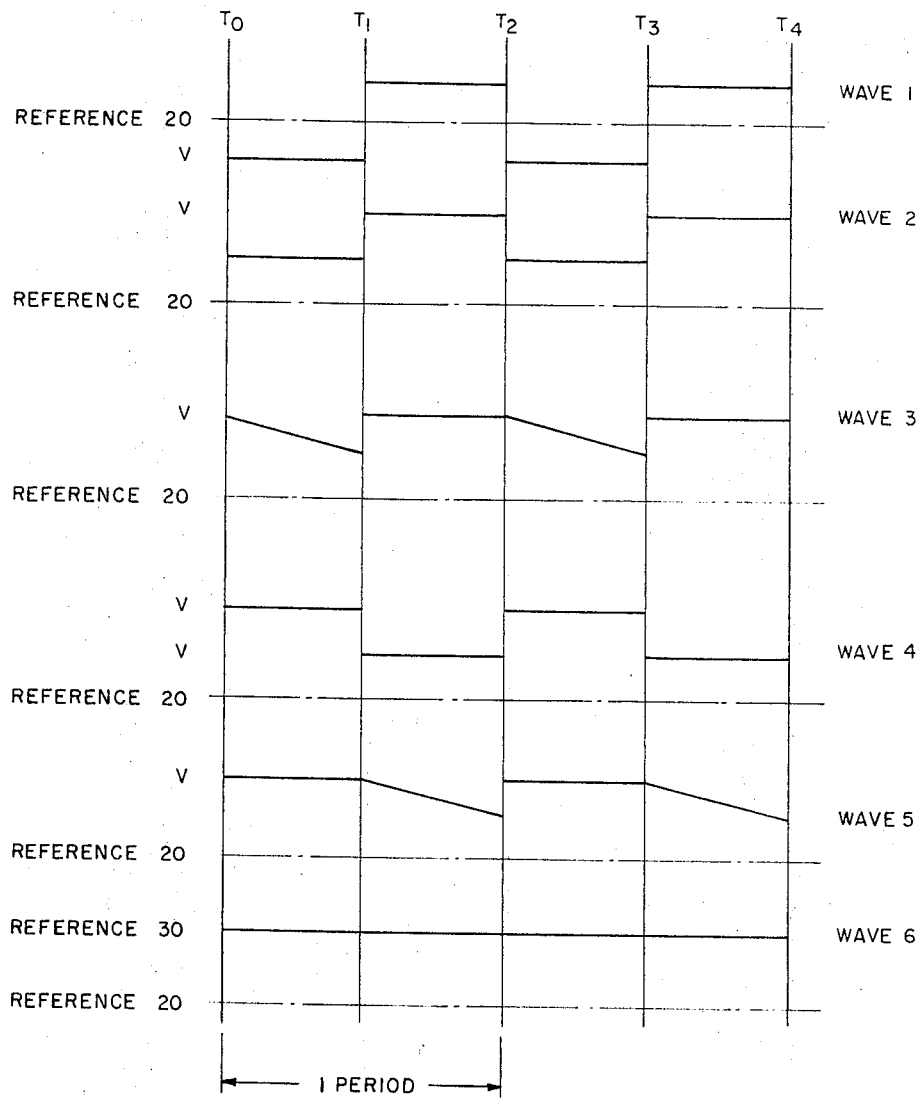
FIG. 2 illustrates the voltage waves of this invention at various points within the circuit.

The operation of the device is as follows in referring to FIGS. 1 and 2. Wave 1 of FIG. 2 is applied across primary winding terminals 16 and 18 with the polarity of the first half cycle of operation as shown by the dot notation that corresponds to the wave from time $T_0$ to time $T_1$ of FIG. 2. Reference point 20 is at ground potential. The polarity of the voltages on the secondary coils that are connected across the base-collector junctions of the transistors from time $T_0$ to $T_1$ are as shown. Thus transistors 22 and 28 are open circuited and transistors 24 and 26 are closed in the upper circuit. Capacitor 12 will be thus charged to the D.C. voltage at terminal 10 during the time from $T_0$ to $T_1$. Thus, when the dot is on the straight line side of the transistors, a positive voltage is applied to the base and the current path through the two emitters of the transistor has very little resistance. The switch is therefore closed. When the dot notation, or positive voltage, is on the collector and the base is negative, then the transistor is cut off and the switch is opened. Now, referring to the other side of the push-pull circuit, transistors 34 and 36 are opened and transistors 32 and 38 are closed during the time from $T_0$ to $T_1$. Under these conditions of voltage polarities as shown in FIG. 1, capacitor 12 will be charging and capacitor 14 will be discharging. In the next half cycle of the wave across the primary winding terminals 16 and 18, the opposite will be true. That is, capacitor 14 will be charging and capacitor 12 will be releasing energy.

Manual switches 40 and 50 control the voltage released from capacitors 12 and 14 respectively and apply the voltages to terminal 30. When manual switches 40 and 50 are closed and a square wave is being generated from the alternating current source 8, across primary terminals 16 and 18, the waveforms at various junctions in the D.C. transformer circuit will be as shown in FIG. 2. Now turning to FIG. 2 and referring to FIG. 1 for the appropriate terminals and junctions where the reference waveforms appear. Wave 1 as has been stated is the wave that will appear across terminals 16 and 18. The phasing is shown by the dots adjacent the primary coil and secondary windings during the time from $T_0$ to $T_1$. Reference 20 is the same potential in waves 1 through 6 and is zero volts potential. Symbol $T_0$ is the start time of the first half cycle and lasts until time $T_1$ at which time the second half cycle begins and lasts until time $T_2$. Symbol $+V$ is the input voltage present at terminal 10, and $+2V$ is the output voltage present at terminal 30. During the time from $T_0$ to $T_1$, wave 2 will be seen at junction 25 and wave 3 will be seen at point 27. During this same time, $T_0$ to $T_1$, transistors 34 and 36 are off and 32 and 38 are on, placing capacitor 14 in series with $+V$ at terminal 10. Wave 4 will be seen at point 15 and wave 5 will be seen at point 29. Closing manual switches 40 and 50 sums waves 3 and 5, resulting in wave 6, at terminal 30. From time $T_0$ to $T_1$, wave 3 is being reduced toward $+V$ and wave 5 is $+2V$. From time $T_1$ to $T_2$, wave 3 is $+2V$ and wave 5 is being reduced toward $+V$. The resultant of adding waves 3 and 5 is to produce wave 6, or a continuous $+2V$, at the output terminal 30 at any instant of time.

Figure 3:
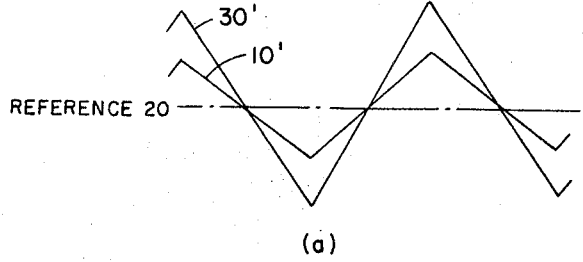
FIGS. 3(a) and 3(b) illustrate triangular waveforms at the input and output of the direct current transformer.
Figure 3:
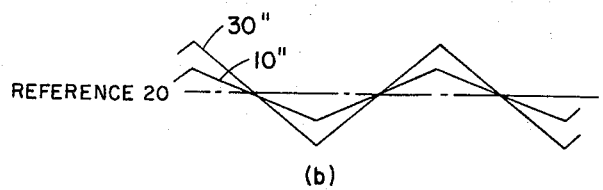

FIGS. 3(a) and (b) show triangular waveforms, instead of the square wave waveforms as explained above in the direct current transformer. The switching frequency is 20 kilo-hertz. FIG. 3(a) shows the input compared to the output of a 100 hertz triangular wave. The lower amplitude wave 10' is the input and the higher amplitude wave 30' is the output. It can readily be seen that the output is two times the input. A triangular wave was chosen to show linearity and phase shift. FIG. 3(b) shows the input and output reversed. The input is the larger wave 30" and the smaller wave 10" is the output. The output is one half the input.

While a specific embodiment of the invention has been shown and described, other embodiments may be obvious to one skilled in the art, in light of this disclosure. The invention should be limited in scope only by the following claims:

I claim:

1. A direct current transformer comprising: an input terminal adapted for receiving a direct current voltage and an output terminal adapted for connecting the transformed voltage to an exterior circuit; first and second storage capacitors; first and second switching means connected between said input and output terminals; a first junction between said first and second switching means; third and fourth switching means connected between said input terminal and a fixed voltage reference; a second junction between said third and fourth switching means, with said first storage capacitor connected between said first and second junctions; fifth and sixth switching means connected between said input and output terminals; a third junction between said fifth and sixth switching means; seventh and eighth switching means connected between said input terminal and said fixed voltage reference; a fourth junction between said seventh and eighth switching means, with said second storage capacitor connected between said third and fourth junctions; an alternating current source having a primary coil and eight secondary coils with said eight secondary coils associated with and controlling said first, second, third, fourth, fifth, sixth, seventh, and eighth switching means, said first and fourth switching means being closed and said second and third switching means being open at any given instant, with said fifth and eighth switching means being open and said sixth and seventh switching means being closed at the same given instant, all of said switching means changing operation on each half cycle of said alternating current source voltage, the above switching arrangement providing for one of said first and second storage capacitors to be in series with said direct current voltage at said input terminal at all times for doubling said input direct current voltage at said output terminal.

2. A direct current transformer as set forth in claim 1 wherein said first, second, third, fourth, fifth, sixth, seventh, and eighth switching means are integrated chopper type transistor switches each having base, collector and two emitter electrodes, with the circuit between said two emitters being a conduction path and the base-collector circuit being connected across one of said eight secondary coils for switching said two emitter conduction path; and first and second manually controlled switches, with said first manually controlled switch connected between said second integrated chopper type switch and said output terminal and said second manually controlled switch connected between said sixth integrated chopper type switch and said output terminal, said first and second manually controlled switches being used to isolate said output terminal from said input terminal as desired.

3. A direct current transformer as set forth in claim 2 wherein said first and second storage capacitors are equal in capacity.

References Cited

UNITED STATES PATENTS

| | | | |
|---|---|---|---|
| 2,773,200 | 12/1956 | Guggi | 307—110 |
| 3,217,310 | 11/1965 | Pearson et al. | 307—110 X |
| 3,432,738 | 3/1969 | Jensen | 321—15 |
| 3,470,443 | 9/1969 | Berry et al. | 321—2 |

OTHER REFERENCES

Western Electric Technical Digest, "Capacitive Voltage Reducer," No. 12, pp. 25, 26, October 1968.

J D MILLER, Primary Examiner

W. H. BEHA, Jr., Assistant Examiner

U.S. Cl. X.R.
307—110; 321—15